United States Patent
Foster et al.

[15] 3,703,741
[45] Nov. 28, 1972

[54] TORQUE RESISTING AXLE ASSEMBLY

[72] Inventors: John R. Foster; Larry R. Hunt, both of Indianapolis, Ind.

[73] Assignee: Von Duprin, Inc., Indianapolis, Ind.

[22] Filed: April 21, 1971

[21] Appl. No.: 135,909

[52] U.S. Cl. .............................16/112, 85/4, 30/266, 16/169, 287/96, 287/101
[51] Int. Cl. ..................................A47b 95/02
[58] Field of Search ..............16/112, 111, 169; 85/4; 30/266; 287/96, 101

[56] References Cited

UNITED STATES PATENTS

| | | | |
|---|---|---|---|
| 780,526 | 1/1905 | Reitz | 30/266 |
| 2,582,184 | 1/1952 | Wheeler | 30/266 |
| 1,545,211 | 7/1925 | Storz | 30/266 |

Primary Examiner—Bobby R. Gay
Assistant Examiner—Doris L. Troutman
Attorney—Hood, Gust, Irish, Lundy & Coffey

[57] ABSTRACT

An axle assembly particularly for an oscillable element, consisting of a headed spool having a threaded bore opening through its unheaded end, a headed screw having a threaded shank receivable in the spool bore, and a shroud having a head portion enshrouding the screw head and a shank portion loosely sleeved on the screw shank between the screw head and its threads and having an outer diameter equal to that of the spool, the mating ends of the spool and shroud being formed for non-rotational interengagement so that the spool and the screw will be protected against relative rotary movement as a result of the operation of the oscillable element.

7 Claims, 5 Drawing Figures

PATENTED NOV 28 1972

3,703,741

INVENTORS
JOHN R. FOSTER
LARRY R. HUNT
BY
Hood, Gust, Irish, Lundy & Coffey
ATTORNEYS

TORQUE RESISTING AXLE ASSEMBLY

The present invention relates to an axle assembly primarily intended to support an element for oscillation about the axis of said axle. In many environments, an element is mounted for oscillation between spaced lugs by aligning a perforation through said element with larger, aligned perforations through said lugs by entering headed members through the lug perforations, respectively, at least one of said members penetrating the element perforation, and threadedly connecting said members to each other in coaxial alignment, the heads of said members being larger than the perforation through said element. A serious disadvantage of such an assembly is that, as a result of longcontinued oscillation of said element, the threaded connection between said members becomes loosened or completely disengaged. The primary object of the present invention is completely to prohibit such loosening.

A further object of the invention is to provide, in an axle assembly of the character above defined, means completely enshrouding the head of one of the threadedly connected members and rotationally fixed relative to the other of said members. Still another object of the invention is to provide, in such an assembly, a peripheral series of teeth of particular shape at that end of the shroud remote from its heat and a closely-intermeshing peripheral series at the adjacent end of the other member, likewise of particular shape, whereby, when the two coaxial members are screwed together, the teeth on the shroud will automatically and inevitably seek and attain a proper intermeshing relationship with the teeth on the other member which will affirmatively hold the shroud and said other member against any relative rotational movement about their common axis as a result of oscillation of the oscillable member journalled thereon.

Further objects of the invention will appear as the description proceeds.

To the accomplishment of the above and related objects, the present invention may be embodied in the form illustrated in the accompanying drawing, attention being called to the fact, however, that the drawing is illustrative only, and that change may be made in the specific construction illustrated and described so long as the scope of the appended claims is not violated.

Figure 1:
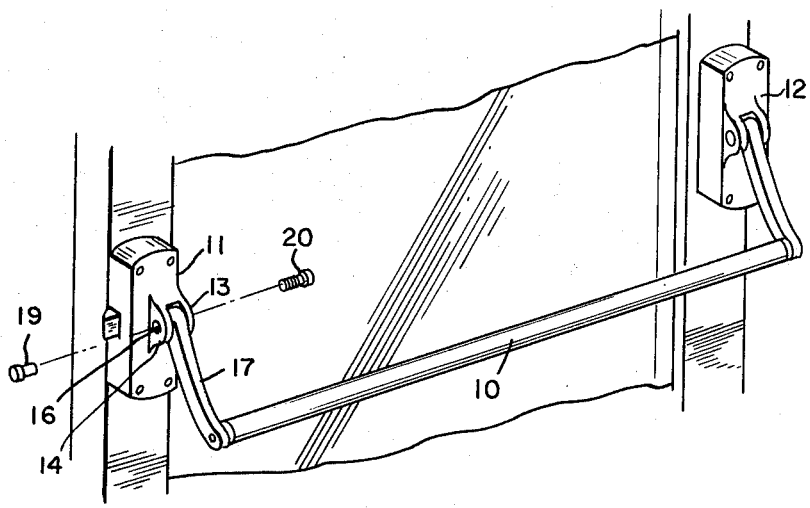
FIG. 1 is a fragmentary, somewhat diagrammatic illustration of a conventional panic exit device mounted upon a door with conventional means for oscillably supporting the conventional panic bar.

Referring more particularly to the drawing, it will be seen that, in FIG. 1 we have illustrated a conventional panic exit device comprising a panic bar 10 supported from a latch case 11 mounted at the free edge of the door and a supporting case 12 mounted at the hinged edge of the door. Each of the cases 11 and 12 is formed in its front face with a slot (not shown) bordered by a pair of forwardly-projecting lugs 13 and 14. The lugs of each case are formed with aligned perforations 15 and 16, usually of a common diameter.

At each end of the panic bar 10 is a lever arm 17, the distal end of one arm 17 being received between the lugs 13 and 14 of the case 11 and being formed with a finger (not shown) penetrating the associated slot to actuate latch mechanism (not shown) within the case 11; and the corresponding end of the other lever 17 is similarly associated with the lugs of the case 12. The arm 17 is formed with a perforation 18 adapted to be aligned with the perforations 15 and 16, but of somewhat smaller diameter. A spool or sleeve 19 is internally axially threaded and is entered through the perforation 16 and into the perforation 18, while an externally threaded screw 20 is entered through the perforation 15 and threadedly engaged within the spool 19, the axle parts then being turned down until their heads are wholly received in the perforations 15 and 16 while their shanks are disposed within the perforation 18 to provide a journal mounting for the lever 17.

If the cases 11 and 12 are absolutely accurately located on the door so that the axle assemblies 19, 20 are absolutely coaxial, very little difficulty in the functioning of those assemblies is usually encountered. However, since the cases 11 and 12 are customarily mounted in the field, absolute accuracy of alignment is seldom achieved. As a consequence, the levers 17 are usually "cocked" with the result that each axle assembly is subjected to a twisting force which causes the heads of the axle members 19 and 20 to bind in their perforations 15 and 16. Thus, each time the levers 17 are actuated, there is a tendency for one of the members 19 and 20 to be turned slightly relative to the other, in one direction or the other. Depending upon slip, that relative movement may be minutely greater in one direction than in the other, so that in some cases successive oscillations of a lever 17 will have a cumulative effect upon its axle, causing the screw to back away from the spool in minute successive steps until finally the two axle members will be completely disengaged and will fall out of the panic exit device assembly.

Applicants' assignee is the pioneer, and presently a leader, in the manufacture of panic exit devices and for many years has been seeking a solution to this problem. Many expedients have been unsuccessfully tried not only by applicants' assignee but by its competitors, without complete success. The records of applicants' assignee, just prior to the present invention, indicate that, in approximately 50 percent of all installations of the character above described, at least one of the axle assemblies will, during the life of the installation, thus separate and fall out of the assembly.

The present invention completely overcomes that difficulty.

Figure 2:
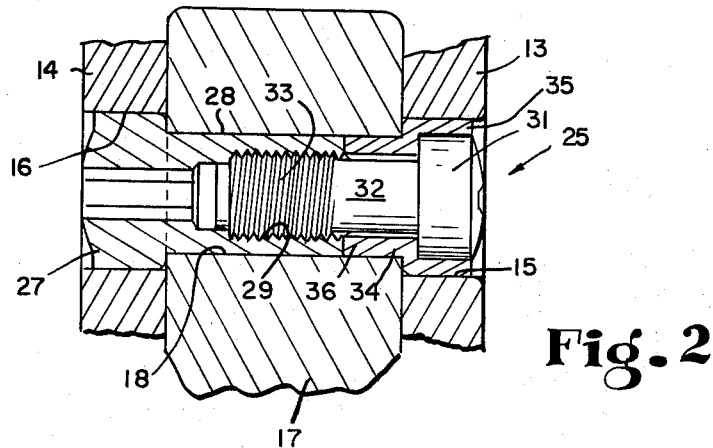
FIG. 2 is an enlarged, fragmental section through a mounting for one lever arm of such a panic bar, and illustrating our improved axle assembly in use.
Figure 3:
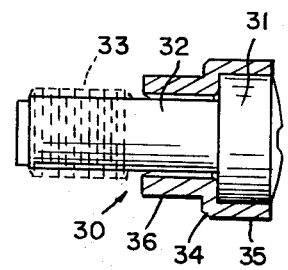
FIG. 3 is an elevation of the screw blank with the shroud means of the present invention sleeved thereon.
Figure 4:
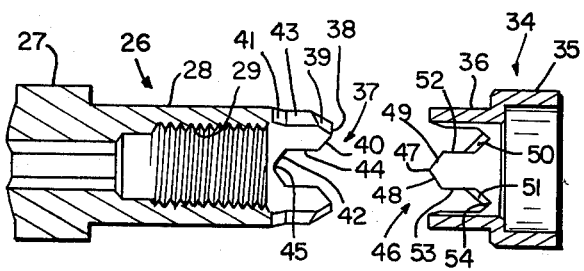
FIG. 4 is a section through the spool or sleeve and the shroud of the present invention shown in separated condition.
Figure 5:
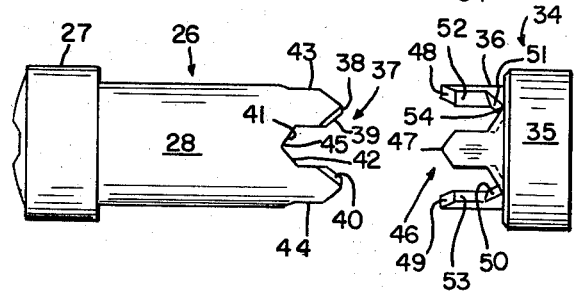
FIG. 5 is an elevation of the spool and shroud shown in FIG. 4, again axially-spaced relation.

The axle assembly of the present invention is indicated generally by the reference numeral 25 in FIG. 2. A spool or sleeve, indicated generally by the reference numeral 26, comprises a head 27 snugly rotatably receivable in the perforation 16 of the tab 14, and a cylindrical shank 28 snugly rotatably receivable in the perforation 18 of a lever arm 17. The shank 28 is formed with an internally threaded bore 29 opening through that end of the spool remote from its head.

A screw blank indicated generally by the reference numeral 30 is formed with a head 31, somewhat smaller than the perforation 15, and a shank 32. A shroud 34 is formed to provide a head section 35 snugly rotatably receiving the screw head 31, and a shank portion 36 freely rotatably sleeved on the screw shank 32, the external diameter of the shroud head section 35 being such as to be snugly rotatably receivable in the perforation 15 of the lug 13. The external diameter of the shroud shank 36 is equal to that of the spool shank 28.

The shroud 34 is sleeved onto the screw blank 30 and thereafter the thread 33, for engagement with the spool thread 29, is rolled into the blank to retain the shroud against removal from the finished screw.

To mount a lever arm 17, its distal portion is inserted between the ears 13 and 14 and its perforation 18 is coaxially aligned with the perforations 15 and 16. Now, the spool 26 is inserted through the perforation 16 and into the perforation 18 and the shrouded screw is inserted through the perforation 15 and into the bore of the spool 26. Now, the spool 26 and the screw 30 are relatively rotated to draw two parts coaxially together, substantially to the condition illustrated in FIG. 2.

The adjacent ends of the members 26 and 34 are formed with cooperative means effective, when the parts have been so drawn together, to prevent relative rotational movement between the spool and the shroud; and, since the shroud thus cannot lag behind the spool in any rotational movement of the later, or vice versa, and since the screw 30 is protected against frictional contact with anything except the shroud and the spool, there is no way in which oscillatory movement of the lever arm 17 can exert any force tending to cause relative rotational movement between the spool and the screw. As a consequence, oscillation of the lever 17, no matter how many times repeated, cannot cause separation or even loosening of the axle parts.

Quite obviously, if the invention is to be absolutely effective to cure the troubles outlined above, relative rotational movement between the spool 26 and the shroud 34 must be absolutely prevented. The particular tooth structure now to be described is optimum for the reason that it has been found to be effective to achieve such complete relative immobility.

The distal end of the spool 26 is formed to provide a peripheral series 37 of equiangularly spaced identical teeth. Each tooth is formed to provide a sharp tip 38 defined by a pair of peripherally diverging plane surfaces 39 and 40. At its base or root, each tooth is defined by a pair of peripherally diverging plane surfaces 41 and 42 parallel with the surfaces 39 and 40, respectively. In the preferred form of the invention, each tooth further displays peripherally oppositely facing, substantially axially-extending plane faces 43 and 44 joining the proximal ends of the surfaces 39 and 40 with the distal ends of the surfaces 41 and 42. In the preferred form of the invention, each of the plane surfaces at the root of each tooth meets a plane surface at the root of an adjacent tooth in a sharp line.

In the preferred form of the invention, the tooth surfaces 39 and 40 incline radially outwardly and away from the tip 38.

Similarly, the distal end of the shroud shank 36 is formed to provide a corresponding peripheral series 46 of teeth correspondingly shaped and spaced for solid interengagement with the teeth of the series 37. Each tooth of the series 46 is formed to provide a sharp tip 47 defined by peripherally diverging plane surfaces 48, 49. At its base or root, each tooth is defined by peripherally diverging plane surfaces 50, 51 parallel with the surfaces 48, 49. In the preferred form of the invention, the surfaces 50, 51 incline radially inwardly and away from the tip 47. Each of the plane surfaces 50, 51 of each tooth meets a root plane surface of an adjacent tooth in a sharp angle as at 54. Each tooth displays peripherally oppositely facing, substantially axially-extending plane faces 52, 53 joining the proximal ends of the tip-defining surfaces with the distal ends of the root-defining surfaces. The length of the teeth of the series 46 is equal to the length of the teeth of the series 37 so that, when the parts 26 and 34 are drawn fully together, the tips 38 will bottom in the angles 54 and the tips 47 will bottom in the angles 45 and the surfaces 39 and 40 will bear solidly upon the surfaces 50 and 51 while the surfaces 48 and 49 will bear solidly upon the surfaces 42 and 41.

The teeth of both series may, and preferably will, be so proportioned and designed that, when intermeshed, there will be a slight clearance between the surfaces 52 and 53 of the shroud teeth and the surfaces 44 and 43 of the spool teeth. This clearance is desirable in order that there may be no significant frictional resistance to intermeshing of the two tooth series.

It will be apparent that, because of the relatively sharp tips 38 and 47 and because of the slide angles of the diverging plane surfaces defining those tips, there is virtually no possibility that, as the screw 30 is threaded into the bore of the spool, the teeth of the series 46 might fail to intermesh with the teeth of the series 37. We presently believe that the optimum angle included between the surfaces 39 and 40, between the surfaces 41 and 42, between the surfaces 48 and 49 and between the surfaces 50 and 51 is 100°; but that angle may vary between, for instance, 60° and 120°, so long as the tip angles of one series are equal to the base angles of the mating series.

As the two series of teeth approach each other while the screw 30 is being threaded into the spool 28, the shroud 34 may or may not turn with the screw. When the teeth 46 contact the teeth 37, however, the tips 47 and 38 are so sharp that it will be impossible, as a practical matter, for the tips 47 to lodge against the tips 38. Instead, the tips 47 will engage, and slide axially relative to, either the surfaces 39 or the surfaces 40 of the teeth 37. Thus, as the screw 30 continues to advance, the tips of the teeth 46 will slide down the surfaces 39, thereby being rotationally reversed relative to the rotation of the screw, or down the surfaces 40, thereby being rotationally advanced relative to the direction of rotation of the screw. When the proximal ends of the diverging surfaces on the teeth 46 pass the proximal ends of the surfaces of the teeth 37, the axially-extending surfaces 52 of the teeth 46 will engage the axially-extending surfaces 43 of the teeth 37 and rotational movement of the shroud 34 will be completely stopped. Thereafter, as rotation of the screw 30 is continued, the tooth faces 52 will slide axially against the tooth surfaces 43 while the shroud is held against any rotational movement, until the tooth surfaces 49 engage the surfaces 41. Because of the above-mentioned slight clearance between the axially-extending faces of the two tooth series, this contact will occur slightly before the teeth of the two series have completely bottomed with respect to each other. Therefore, a slight further tightening of the screw relative to the spool will be possible; and during that ultimate tightening, the surfaces 49 will slide along the surfaces 42 until the tips 47 find seats in the sharp angles 45 and the surfaces 48 seat upon the surfaces 42. This latter action, of course, will turn the shroud minutely in a reverse direction, thus minutely separating the surfaces 52 from the surfaces 44.

In this condition of the assembly, the shroud 34 is firmly held against any rotational movement relative to the spool 26 and the screw head 32, being completely enshrouded, is protected against the application thereto, by oscillatory movement of the lever 17, of any force tending to turn the screw relative to the spool. Preferably, the parts are so proportioned and designed that, when the teeth have so bottomed, the heads 27 and 35 are disposed within the perforations 16 and 15 and closely adjacent the end of the lever arm 17, but with sufficient clearance to permit movement of the axle assembly 25 relative to the lever arm 17 and relative to the lugs 13 and 14.

We presently believe that the above-mentioned radial inclination of the surfaces 39 and 40 and the surfaces 50 and 51 somewhat improves the solidity of the nonrational engagement between the spool and the shroud; but we do not consider such inclination to be essential. As shown, the angle of such inclination is approximately 30° from a plane perpendicular to the common axis of the spool and shroud, but we believe that that angle is variable between 0° and about 40°.

We claim:

1. An axle assembly for an oscillable element comprising a first member having a cylindrical shank and a head, a second member having a cylindrical shank and a head, said members being formed for coaxial threaded association with their heads remote from each other, and a shroud rotatably sleeved on one of said members to enshroud the head and a portion of the shank of said one member, said shroud having a shank whose diameter is equal to that of the shank of the other of said members, a peripheral series of longitudinally-extending teeth at the distal end of the shank of said shroud, and a closely-meshing peripheral series of longitudinally-extending teeth at the distal end of the shank of said other member to prevent relative turning movement between said shroud and said other member about their common axis, each tooth of each series being defined at its tip by peripherally diverging plane surfaces.

2. The axle assembly of claim 1 in which each tooth of each series is defined at its root by peripherally diverging plane surfaces parallel with said first-named surfaces.

3. The axle assembly of claim 2 in which each of the plane surfaces at the root of each tooth meets a plane surface at the root of an adjacent tooth.

4. The axle assembly of claim 2 in which each tooth of each series displays peripherally oppositely facing, substantially axially-extending plane faces joining the proximal ends of said tip-defining surfaces with the distal ends of said root-defining surfaces.

5. The axle assembly of claim 3 in which each tooth of each series displays peripherally oppositely facing, substantially axially-extending plane faces joining the proximal ends of said tip-defining surfaces with the distal ends of said root-defining surfaces.

6. The axle assembly of claim 5 in which the root-defining surfaces of the teeth of one series incline radially inwardly and the tip-defining surfaces of the teeth of the other series incline radially outwardly.

7. In a panic exit device, a case mounted on a closure and providing a pair of spaced lugs, said lugs being formed with aligned apertures, a panic bar having, at one end, a lever arm having a portion proportioned and designed to fit between said lugs, said portion being formed with an opening aligned with, but diametrically smaller than, said aligned apertures, and an axle for said lever comprising a spool having a head snugly received in one of said aligned apertures and an internally threaded shank snugly received in said opening, a screw having a head and having a shank threadedly received in said spool bore, and a shroud having a head portion enshrouding said screw head and snugly received in the other of said aligned apertures and having a shank portion loosely sleeved on said screw shank and snugly received in said opening, said spool and said shroud shank portion being provided with mating, interengaging means to prevent relative rotational movement between said spool and said shroud.

* * * * *

UNITED STATES PATENT OFFICE
CERTIFICATE OF CORRECTION

Patent No. 3,703,741          Dated November 28, 1972

Inventor(s) John R. Foster and Larry R. Hunt

It is certified that error appears in the above-identified patent and that said Letters Patent are hereby corrected as shown below:

Column 1, line 27, "heat" should be -- head --; line 61, after "again" insert -- in --.
Column 3, line 23, after "draw" insert -- the --.
Column 4, line 47, after "teeth 46" insert -- first --.
Column 5, line 15, "head 32" should be -- head 31 --; line 29, "rational" should be -- rotational --.

Signed and sealed this 8th day of May 1973.

(SEAL)
Attest:

EDWARD M.FLETCHER,JR.
Attesting Officer

ROBERT GOTTSCHALK
Commissioner of Patents